(12) United States Patent
Narushima

(10) Patent No.: US 11,194,155 B2
(45) Date of Patent: Dec. 7, 2021

(54) HEAD-UP DISPLAY DEVICE

(71) Applicant: Yazaki Corporation, Tokyo (JP)

(72) Inventor: Noriaki Narushima, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 112 days.

(21) Appl. No.: 16/794,402

(22) Filed: Feb. 19, 2020

(65) Prior Publication Data

US 2020/0301136 A1    Sep. 24, 2020

(30) Foreign Application Priority Data

Mar. 22, 2019 (JP) .............................. JP2019-054408

(51) Int. Cl.
*G02B 27/01* (2006.01)
*B60K 35/00* (2006.01)

(52) U.S. Cl.
CPC .......... *G02B 27/0101* (2013.01); *B60K 35/00* (2013.01); *B60K 2370/1529* (2019.05); *G02B 2027/0118* (2013.01)

(58) Field of Classification Search
CPC .... G03B 21/008; G03B 21/28; G03B 21/145; G03B 21/208; G03B 21/2013; G03B 21/2033; G03B 21/2053; B60K 2370/23; B60K 2370/31; B60K 2370/333; B60K 2370/334; B60K 2370/349; B60K 2370/1529; G02B 2027/013; G02B 2027/0116; G02B 2027/0118; G02B 2027/0127; G02B 2027/0172; G02B 2027/0196; G02B 27/01; G02B 27/095; G02B 27/0101; G02B 27/0179; G02B 27/0944; G02B 27/0966; G02B 27/0977; G02B 27/0025; G02B 27/0056; G02B 27/0062; G02B 27/1053

See application file for complete search history.

(56) References Cited

U.S. PATENT DOCUMENTS

| 2011/0075434 A1* | 3/2011 | Kurokawa ......... G02B 27/0101 362/459 |
| 2014/0022645 A1* | 1/2014 | Matsuura ............. G02B 3/0006 359/626 |
| 2018/0321488 A1 | 11/2018 | Usukura et al. |

(Continued)

FOREIGN PATENT DOCUMENTS

| EP | 1 605 283 A2 | 12/2005 |
| JP | 2009-169399 A | 7/2009 |

(Continued)

*Primary Examiner* — Sultan Chowdhury
(74) *Attorney, Agent, or Firm* — Sughrue Mion, PLLC

(57) ABSTRACT

The head-up display device includes a light source; a condensing lens; a lens array diffusing light from the condensing lens; a liquid-crystal display unit emitting light from the lens array as display light; and a reflecting member reflecting the display light emitted from the liquid-crystal display unit and projecting the display light on a windshield. The lens array has, in an emitting surface, a plurality of lens surfaces projecting toward the liquid-crystal display unit and having an aspherical sectional shape, and, in the lens surface, the curvature radius of a part emitting display light to be projected on an upper part of the windshield is smaller than the curvature radius of a part emitting display light to be projected on a lower part of the windshield.

18 Claims, 6 Drawing Sheets

(56) References Cited

U.S. PATENT DOCUMENTS

| | | | |
|---|---|---|---|
| 2018/0341110 A1* | 11/2018 | Hirata | G06F 3/013 |
| 2019/0129171 A1* | 5/2019 | Narushima | G02B 27/0101 |
| 2019/0346674 A1* | 11/2019 | Miyake | G02B 27/01 |
| 2019/0369395 A1* | 12/2019 | Ohyama | B60K 35/00 |
| 2020/0174279 A1* | 6/2020 | Ishihara | G03B 35/24 |
| 2021/0102426 A1* | 4/2021 | Nishinaka | E06B 5/00 |

FOREIGN PATENT DOCUMENTS

| | | |
|---|---|---|
| WO | 2016/084744 A1 | 6/2016 |
| WO | 2019/044730 A1 | 3/2019 |

\* cited by examiner

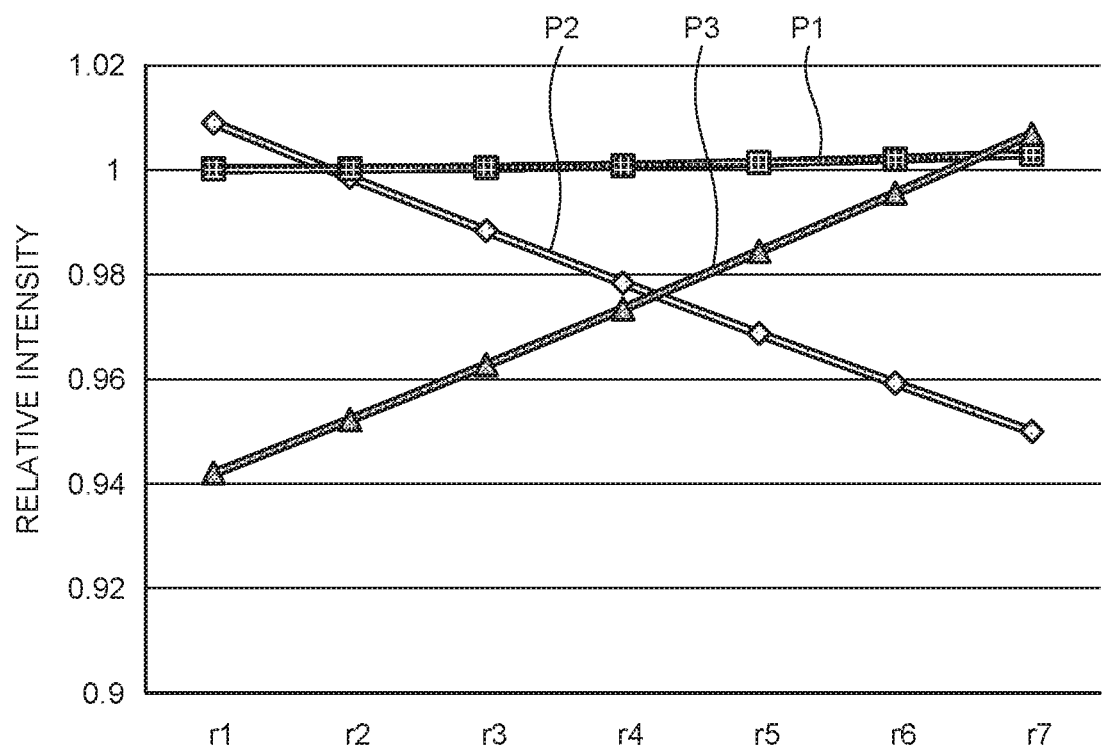

HEAD-UP DISPLAY DEVICE

CROSS-REFERENCE TO RELATED APPLICATION(S)

The present application claims priority to and incorporates by reference the entire contents of Japanese Patent Application No. 2019-054408 filed in Japan on Mar. 22, 2019.

BACKGROUND OF THE INVENTION

1. Field of the Invention

The present invention relates to head-up display devices.

2. Description of the Related Art

There have been known head-up display devices installed in a vehicle. Such a head-up display device projects a display image on a windshield to display a virtual image in front of the windshield. For example, Japanese Patent Application Laid-open No. 2009-169399 discloses technology about a head-up display device displaying a virtual image with display light emitted by a liquid-crystal display that includes a liquid-crystal display panel and a light-emitting element performing transmitted illumination of the liquid-crystal display panel, wherein the liquid-crystal display includes a lens group condensing illumination light emitted by the light-emitting element in vertical and horizontal directions, and the vertical convergence of the lens group is different from the horizontal convergence thereof. It is considered that the head-up display device disclosed in Japanese Patent Application Laid-open No. 2009-169399 can display the virtual image with high luminance.

In such a head-up display device, variation in a viewpoint position of an occupant in a vertical direction of a vehicle may cause an image projected on a windshield to be viewed such that its brightness varies due to a difference in light reflectivity of the windshield in the vertical direction.

SUMMARY OF THE INVENTION

The object of the invention is to provide a head-up display device that can prevent the luminance of the image from varying when the viewpoint position of an occupant varies in the virtual direction.

In order to achieve the above mentioned object, a head-up display device according to one aspect of the present invention includes a light source; a condensing lens that condenses light from the light source; a lens array having an incident surface opposed to the condensing lens and an emitting surface that is an opposite surface to the incident surface, the lens array diffusing the light from the condensing lens; a liquid-crystal display unit that is opposed to the emitting surface, and is configured to emit the light as display light by allowing light from the lens array to pass therethrough; and a reflecting member reflecting display light emitted from the liquid-crystal display unit and projecting the display light on a windshield disposed in front of a driver's seat of a vehicle, wherein the lens array has, in the emitting surface, a plurality of lens surfaces projecting toward the liquid-crystal display unit and having an aspherical sectional shape, and in the lens surface, a curvature radius of a part emitting display light to be projected on an upper part of the windshield is smaller than a curvature radius of a part emitting display light to be projected on a lower part of the windshield.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a graph view illustrating a relation between the shapes of the lens surfaces of the lens array and relative intensities of an image seen from eye points.

DETAILED DESCRIPTION OF THE PREFERRED EMBODIMENTS

A head-up display device according to an embodiment of the present invention will now be described in detail with reference to the drawings. Note that this invention is not limited by this embodiment. Components in the following embodiment include that one skilled in the art easily assumes, or substantially the same as those.

Embodiment

Figure 1:
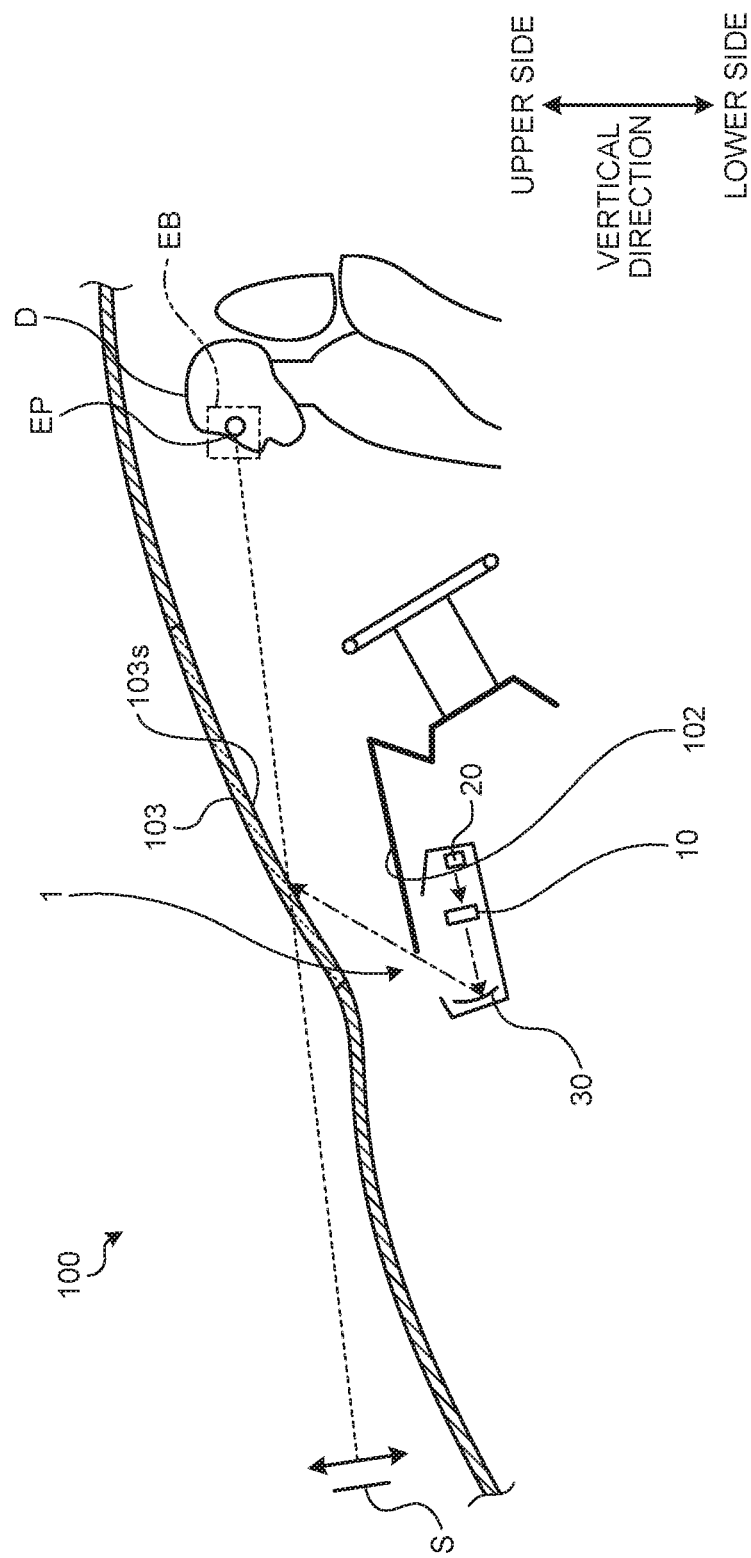
FIG. 1 is a schematic configuration view of a head-up display device according to an embodiment.
Figure 2:
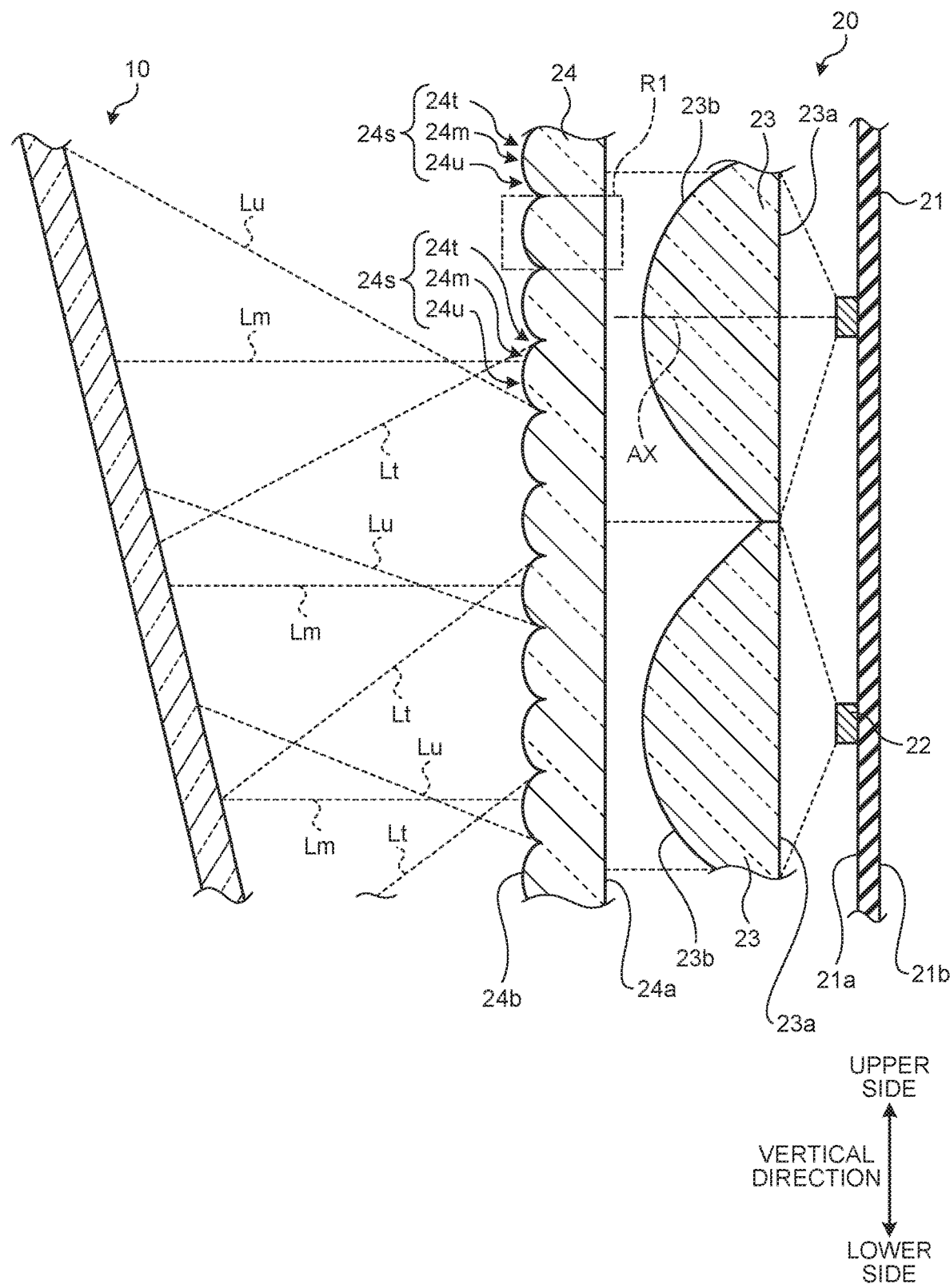
FIG. 2 is a sectional view illustrating the head-up display device according to the embodiment.
Figure 3:
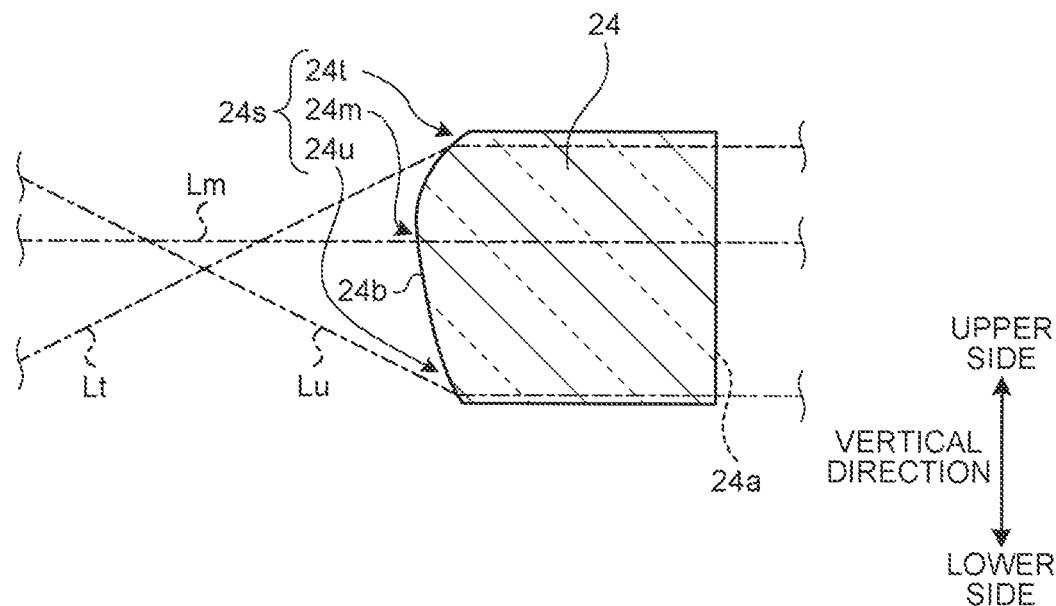
FIG. 3 is an expanded sectional view of a lens array of the embodiment.
Figure 4:
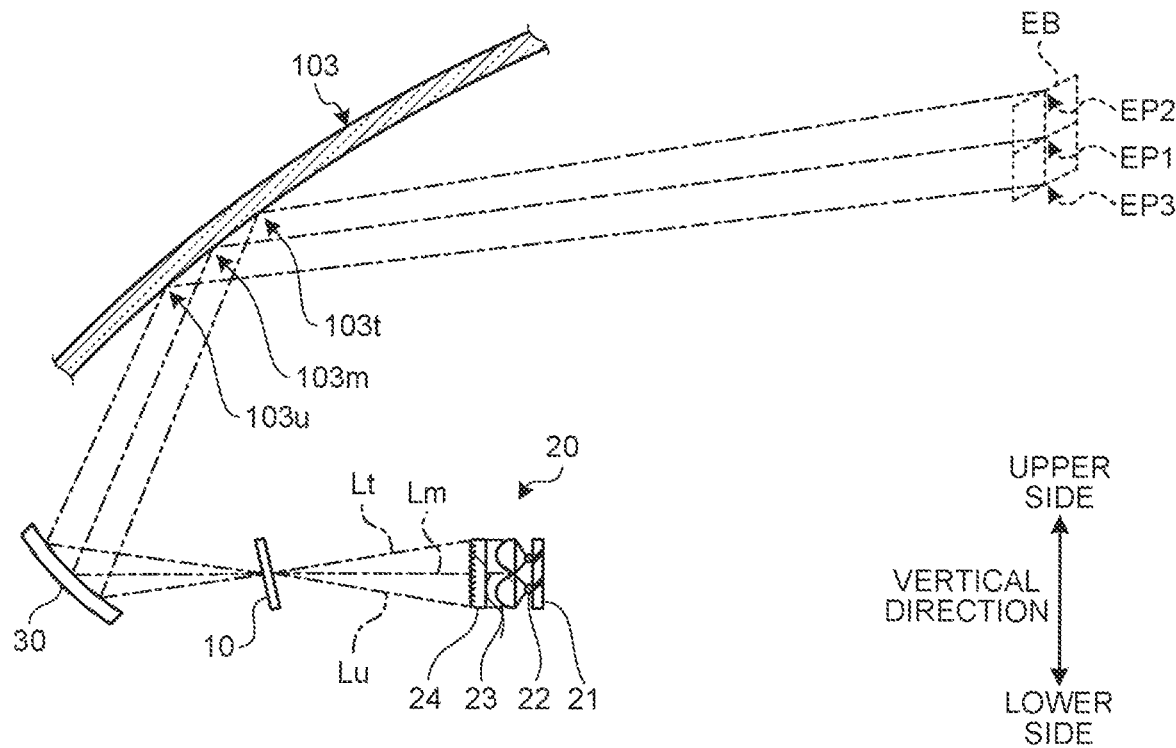
FIG. 4 is a schematic view illustrating optical paths of light from a light source toward an eye box in the embodiment.
Figure 5:
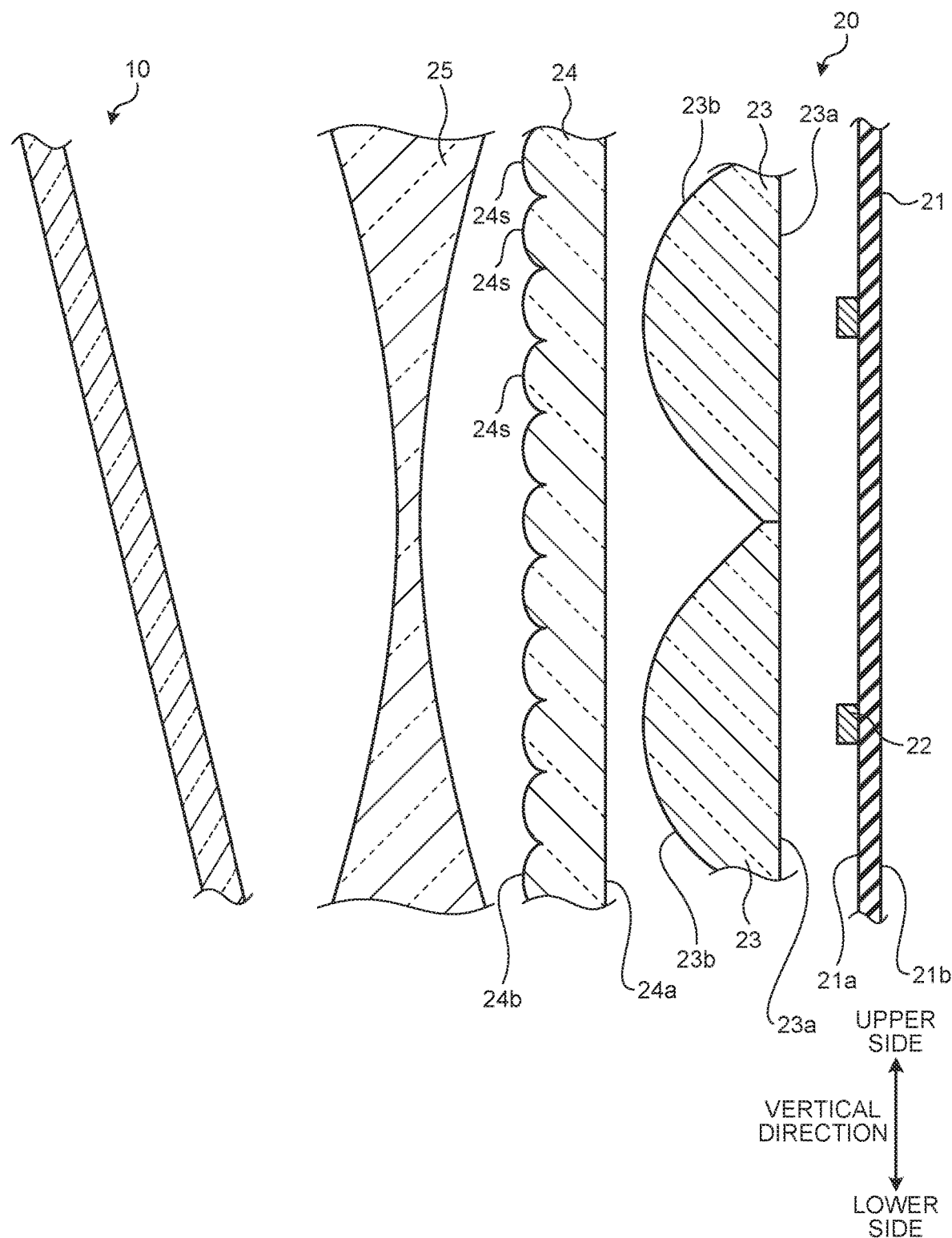
FIG. 5 is a sectional view illustrating the head-up display device according to the embodiment.
Figure 6:
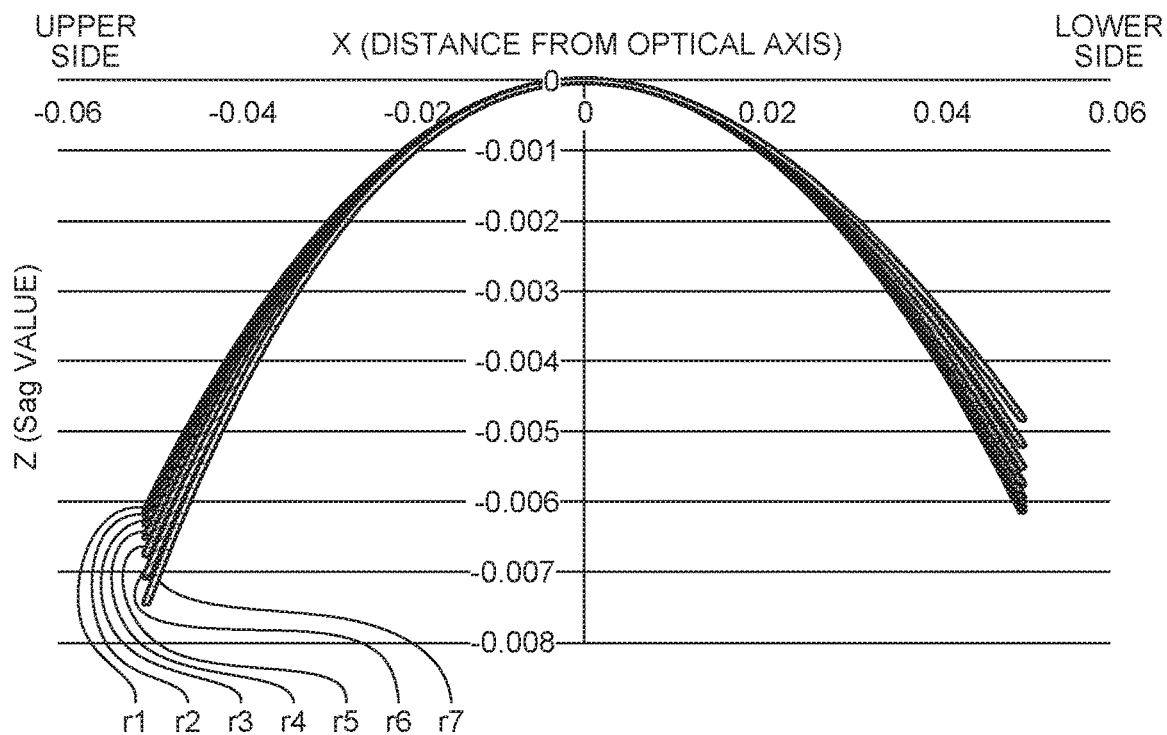
FIG. 6 is a graph view illustrating shapes of lens surfaces of the lens array.
Figure 7:
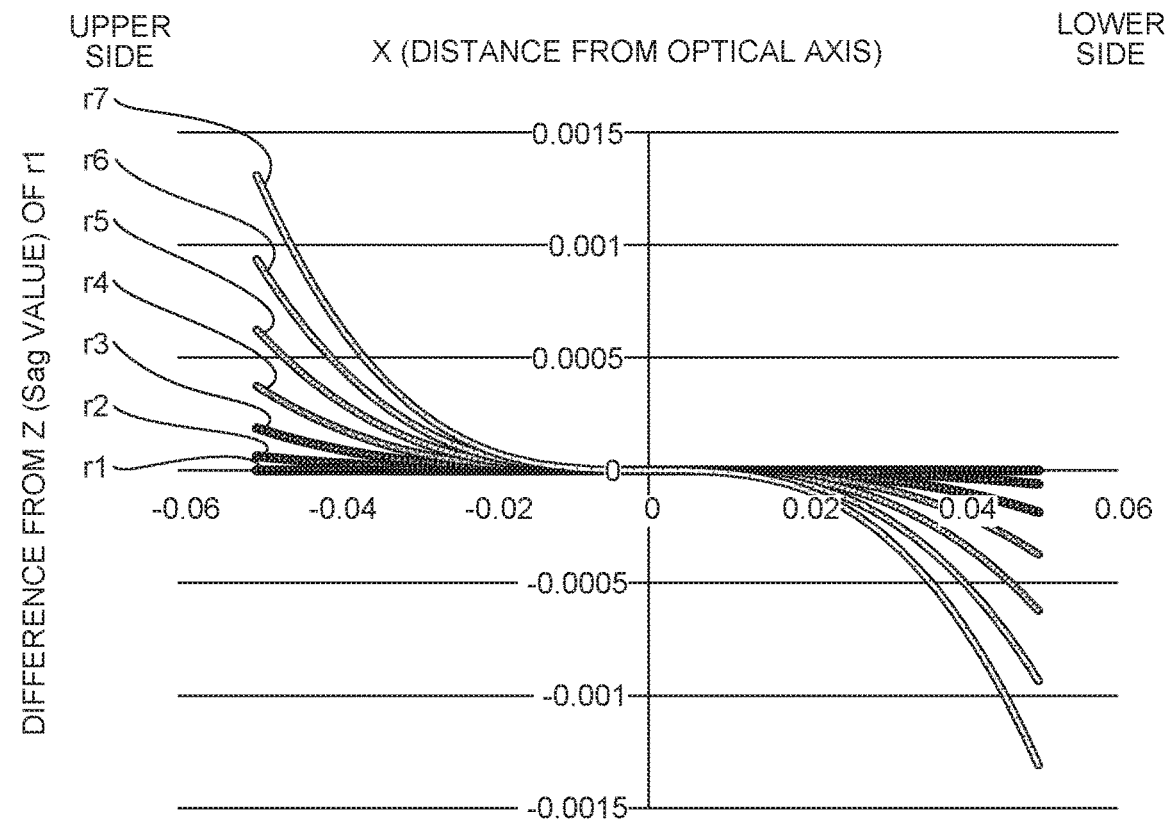
FIG. 7 is a graph view illustrating the shapes of the lens surfaces of the lens array.

An embodiment will be described with reference to FIGS. 1 to 8. The embodiment relates to head-up display devices. FIG. 1 is a schematic configuration view of a head-up display device according to the embodiment. FIG. 2 is a sectional view illustrating the head-up display device according to the embodiment. FIG. 3 is an expanded sectional view of a lens array of the embodiment. FIG. 4 is a schematic view illustrating optical paths of light from a light source toward an eye box in the embodiment. FIG. 5 is a sectional view illustrating the head-up display device according to the embodiment. FIG. 6 is a graph view illustrating shapes of lens surfaces of the lens array. FIG. 7 is a graph view illustrating the shapes of the lens surfaces of the lens array. FIG. 8 is a graph view illustrating a relation between the shapes of the lens surfaces of the lens array and relative intensities of an image seen from eye points. FIGS. 2 and 5 show a section of a backlight unit 20 and a liquid-crystal display unit 10 in a vertical direction of a vehicle. FIG. 3 is an expanded view of an area R1 shown in FIG. 2.

As shown in FIG. 1, a head-up display device 1 according to the embodiment is installed in a vehicle 100, such as cars. The head-up display device 1 is disposed inside a dashboard 102 of the vehicle 100. The head-up display device 1 projects display light toward a reflecting surface 103s of a windshield 103 in the vehicle 100. In the embodiment, the windshield 103 is disposed in front of a driver's seat in the vehicle 100, and the reflecting surface 103s is located in front of the driver's seat in the vehicle 100. The reflecting surface 103s of the windshield 103 may has, for example, a semitransparent coating that reflects one part of incident light and allows the other part of the incident light to pass therethrough. The display light projected on the reflecting surface 103s is reflected from the reflecting surface 103s to an eye box EB of the vehicle 100, and thus viewed as a virtual image S by an occupant D. The eye box EB is an area where the occupant D in the vehicle 100 can view the virtual image S. The eye box EB includes an eye point EP. The Eye point EP is a viewpoint position of the occupant D.

The head-up display device 1 according to the embodiment includes a liquid-crystal display unit 10, a backlight unit 20, and a reflecting member 30.

The liquid-crystal display unit 10 allows light from the backlight unit 20 to pass therethrough to emit the light as display light. The liquid-crystal display unit 10 of the embodiment includes an optically-transparent-type, thin-film-transistor liquid-crystal display (TFT-LCD) and other devices.

The reflecting member 30 is a member reflecting the display light towards the reflecting surface 103s. The reflecting member 30 of the embodiment is a magnifying mirror that magnifies and reflects the display light projected from the liquid-crystal display unit 10. For example, an aspherical (free-curved surface) mirror may be used for the reflecting member 30.

The backlight unit 20 is an illumination device emitting light toward the liquid-crystal display unit 10. As shown in FIG. 2, the backlight unit 20 includes a base material 21, a light source 22, a condensing lens 23, a lens array 24, and other components.

The base material 21 is a board-shaped member having two principal surfaces 21a and 21b. The light source 22 is fixed to one principal surface 21a of the base material 21. In the embodiment, a plurality of the light sources 22 are provided, and the light sources 22 are arranged on the principal surface 21a of the base material 21 in a matrix shape. A light-emitting diode (LED) and other components may be used for the light source 22. The light source 22 turns on when power is supplied from a power supply installed in the vehicle 100. A heat sink (not shown) may be fixed to the other principal surface 21b of the base material 21. The base material 21 accumulates heat generated from the light source 22. Here, the heat sink releases the heat accumulated into the base material 21 to the outside of the backlight unit 20.

The condensing lens 23 is a lens member that condenses light from the light source 22. The condensing lens 23 has an incident surface 23a and an emitting surface 23b. The incident surface 23a is opposed to the light source 22. The emitting surface 23b is a surface on the opposite side to the incident surface 23a. The condensing lens 23 of the embodiment is formed into a rectangle shape, seen from the side of the liquid-crystal display unit 10, and a plano-convex lens where the incident surface 23a is a flat surface and the emitting surface 23b is a convex curved surface. The condensing lens 23 is formed of glass or transparent resin.

The lens array 24 is a lens member diffusing light from the condensing lens 23. The lens array 24 has an incident surface 24a and an emitting surface 24b. The incident surface 24a is opposed to the condensing lens 23. The emitting surface 24b is a surface on the opposite side to the incident surface 24a and opposed to the liquid-crystal display unit 10. The incident surface 24a of the lens array 24 is a flat surface. The emitting surface 24b of the lens array 24 has a plurality of lens surfaces 24s. These lens surfaces 24s project toward the liquid-crystal display unit 10 and have an aspherical sectional shape. The lens array 24 is formed of glass or transparent resin. The distance between the lens array 24 and the condensing lens 23 is set to be shorter than the distance between the lens array 24 and the liquid-crystal display unit 10.

The liquid-crystal display unit 10 displays an image including numbers, characters, graphics, and other objects depending on a control signal from a controller (not shown) installed in the vehicle 100. Here, an image longitudinal direction of the image corresponds to a vertical direction (see FIG. 1) of the vehicle, and an image lateral direction of the image corresponds to a width direction of the vehicle. In the embodiment, the lens surfaces 24s of the lens array 24 extend along the image lateral direction in a ridge shape and are arranged in the image longitudinal direction. The distance between the adjacent lens surfaces 24s in the image longitudinal direction is set to a distance in which no bright line occurs in an image displayed by light emitted from the lens surface 24s. As shown in FIG. 3, the lens surface 24s is formed unsymmetrically in the image longitudinal direction.

As shown in FIG. 2, in the backlight unit 20, the light emitted by the light source 22 is incident on the incident surface 23a of the condensing lens 23. The light incident on the incident surface 23a is condensed by the condensing lens 23, and is condensed from the emitting surface 23b toward the incident surface 24a of the lens array 24 as light parallel substantially to an optical axis AX of the condensing lens 23. The light incident on the incident surface 24a is diffused by the lens array 24.

Here, of light emitted from the emitting surface 24b of the lens array 24, in the image longitudinal direction, light emitted from an upper-side part of the lens surface 24s (upper-side part 24t) is referred to as light Lt; light emitted from a lower-side part of the lens surface 24s (lower-side part 24u) is referred to as light Lu; and light emitted from a part between the upper-side part 24t and the lower-side part 24u of the lens surface 24s (middle part 24m) is referred to as light Lm.

In the lens array 24, the light Lt travels toward the liquid-crystal display unit 10 so as to be inclined downward relative to the optical axis AX of the condensing lens 23, and the light Lu travels toward the liquid-crystal display unit 10 so as to be inclined upward relative to the optical axis AX of the condensing lens 23. The light Lm emitted from the middle part 24m travels toward the liquid-crystal display unit 10 along the optical axis AX.

FIG. 4 shows an optical conjugate relation between the lens array 24 and the eye box EB. As shown in FIG. 4, the light Lt is projected as display light on an upper-side part of the windshield 103 (upper part 103t) via the liquid-crystal display unit 10 and the reflecting member 30. The light Lu is projected as display light on a lower-side part of the windshield 103 (lower part 103u) via the liquid-crystal display unit 10 and the reflecting member 30. The light Lm is projected as display light on a part between the upper part 103t and the lower part 103u of the windshield 103 (middle part 103m) via the liquid-crystal display unit 10 and the reflecting member 30.

The display light projected on the upper part 103t reaches an upper-side area in the eye box EB, and results in display light viewed when the eye point EP of the occupant D is located at the upper-side area in the eye box EB (eye point EP2). The display light projected on the lower part 103u reaches a lower-side area in the eye box EB, and results in display light viewed when the eye point EP of the occupant D is located at the lower-side area in the eye box EB (eye point EP3). The display light projected on the middle part 103m reaches a central area in the eye box EB, and results in display light viewed when the eye point EP of the occupant D is located at the central area in the eye box EB (eye point EP1).

When the display light is incident on the windshield 103 from the reflecting member 30, an incident angle to the windshield 103, a refractive index of the windshield 103, a vibration direction of the display light, and other factors cause the difference in reflectivity of the display light between the upper and lower sides of the windshield 103. Here, in the case where intensities of the display light incident on the upper part 103t, the middle part 103m, and the lower part 103u are equal, a difference in the viewed luminance occurs depending on a position of the eye point EP in the vertical direction. The refractive index of the windshield 103 becomes lower from the upper part 103t toward the lower part 103u. Thus, in the case where the intensities of the display light incident on the upper part 103t, the middle part 103m, and the lower part 103u are equal, an image looks brighter when the image is seen from the eye point EP2 than when the image is seen from the eye point EP1. An image looks darker when the image is seen from the eye point EP3 than when the image is seen from the eye point EP1. Thus, in the case where the intensities of the display light incident on the upper part 103t, the middle part 103m, and the lower part 103u are equal, the occupant D finds that the brightness of the image varies when his/her eye point EP varies in the vertical direction.

In the embodiment, the lens array 24 diffuses the light from the condensing lens 23 such that the luminance of the display light incident on the windshield 103 varies from the upper part 103t to the lower part 103u. As shown in FIG. 3, in the lens surface 24s of the lens array 24, the curvature radius of the upper-side part 24t is formed to be smaller than the curvature radius of the lower-side part 24u. That is, the curvature radius of the part emitting the display light to be projected on the upper part 103t of the windshield 103 (upper-side part 24t) is smaller than the curvature radius of the part emitting the display light to be projected on the lower part 103u of the windshield 103 (lower-side part 24u). In this case, the diffusion angle of the light becomes larger toward a part of the lens surface 24s having a smaller curvature radius. Thus, in the lens surface 24s, the luminance of the light emitted from the part having a relatively small curvature radius (upper-side part 24t) is lower than the luminance of the light emitted from the part having a relatively large curvature radius (lower-side part 24u). Thus, in the windshield 103, the low-luminance display light is emitted to the upper part 103t having a relatively high reflectivity and the high-luminance display light is emitted to the lower part 103u having a relatively low reflectivity. The curvature radius of the lens surface 24s of the embodiment continuously varies from the upper-side part 24t toward the lower-side part 24u. That is, the lens surface 24s is formed such that its curvature radius becomes larger from the upper-side part 24t toward the lower-side part 24u. In the embodiment, the vertex position of the lens surface 24s is located at the slightly upper side of the lens surface 24s.

Here, the backlight unit 20 of the embodiment may further include a field lens 25 as shown in FIG. 5. The field lens 25 is formed of glass or transparent resin allowing light to pass therethrough. The field lens 25 is disposed between the lens array 24 and the liquid-crystal display unit 10. The field lens 25 of the embodiment has one concave curved surface in each of a surface opposed to the lens array 24 and a surface opposed to the liquid-crystal display unit 10. That is, the field lens 25 of the embodiment is a biconcave lens.

The Field lens 25 functions so as to allow the eye box EB in the vehicle 100 and the emitting surface 24b of the lens array 24 to be an optical conjugate relation. Furthermore, the field lens 25 refracts the light emitted from the emitting surface 24b, so that the light from the lens array 24 is effectively irradiated to the liquid-crystal display unit 10. Note that the field lens 25 may have any shape that can exhibit the above-described function and may have any shape except the biconcave shape. For example, the shape of the field lens 25 may be a plano-concave lens shape.

With referring to FIGS. 6 to 8, a relation between the shapes of the lens surfaces 24s of the embodiment and intensities of the image seen from the eye points EP1 to EP3 will now be described.

The shape of the lens surface can be expressed as the following equation (1). In the equation (1), "x" is a distance from an optical axis in a radial direction, "c" is a curvature (reciprocal number of the curvature radius), and "$c_3$" is a third-order aspherical surface coefficient. "z" is the length of a perpendicular line drawn from a point on an aspherical surface at the distance "x" from the optical axis to a tangent of the aspherical surface (Sag value). FIG. 6 shows the shapes of lens surfaces where a value of "c" is "4.672" and a value of "$c_3$" is different from each other.

$$z = \frac{cx^2}{1 + \sqrt{1 - c^2 x^2}} + c_3 x^3 \tag{1}$$

FIG. 6 is a diagram illustrating the shapes of the lens surfaces 24s in the image longitudinal direction, where a horizontal axis represents "x" described above and a vertical axis represents "z" described above. FIG. 6 illustrates the shapes in the image longitudinal direction of a lens surface (sample r1) as a comparative example and the lens surfaces 24s (sample r2, sample r3, sample r4, sample r5, sample r6, and sample r7) having different shapes.

The sample r1, the comparative example, is a lens surface where "$c_3$" is "0" and its shape in the image longitudinal direction is symmetrical. Note that FIG. 6 shows that the length of the perpendicular line drawn from the point on the aspherical surface at the distance "x" from the optical axis to the tangent of the aspherical surface is longer, as a value of "z" is smaller.

The samples r2 to r7 are lens surfaces having "$c_3$" of −0.5", "−1", "−1.5", "−2", "−2.5", and "−3".

FIG. 7 is a graph diagram where the horizontal axis represents "x" and differences between "z" of the sample "r1" and "z" of each of the samples r1 to r7 are plotted in the vertical axis. As shown in FIGS. 6 and 7, relative to the sample r1, the curvature radius of the upper side in the image longitudinal direction is smaller and the curvature radius of the lower side in the image longitudinal direction is larger, as "$c_3$" becomes a smaller value.

FIG. 8 is a graph diagram where the horizontal axis represents the samples r1 to r8, the longitudinal axis represents relative intensities when the display light from the head-up display device 1 using the samples r1 to r8 is seen from each eye point EP (EP1, EP2, and EP3). Here, the relative luminance is a relative value where luminance when the display light from the head-up display device 1 using the sample r1 is seen from the eye point EP1 is assumed as "1".

In FIG. 8, P1 is the luminance of the display light seen from the eye point EP1, P2 is the luminance of the display light seen from the eye point EP2, and P3 is the luminance of the display light seen from the eye point EP3.

As shown in FIG. 8, the difference between the relative luminance P2 of the display light seen from the eye point EP2 and the relative luminance P3 of the display light seen from the eye point EP3 in the samples r2 to r7 is smaller than the difference in the relative luminance in the sample r1, the comparative example. Here, as "$c_3$" becomes smaller to be "−0.5" (sample r2), "−1" (sample r3), and "−1.5" (sample r4), the difference between the relative luminance of the display light seen from the eye point EP2 and the relative luminance of the display light seen from the eye point EP3 becomes smaller. That is, luminance variation when the eye point EP of the occupant D varies from the upper side to the lower side or from the lower side to the upper side in the eye box EB becomes small. As "$c_3$" becomes further smaller to be "−2" (sample r5), "−2.5" (sample r6), "−3" (sample r7), the difference between the relative luminance of the display light seen from the eye point EP2 and the relative luminance of the display light seen from the eye point EP3 becomes larger gradually.

In the embodiment, it is desirable that the shape of the lens surface 24s is a shape to minimize luminance variation width when the viewpoint position (eye point EP) of the occupant D varies along the vertical direction. For example, it is desirable that the shape of the lens surface 24s is a shape to minimize the difference between the luminance of the image viewed when the viewpoint position is the highest position (eye point EP2) in the eye box EB predetermined in the vehicle 100, and the luminance of the image viewed when the viewpoint position is the lowest position (eye point EP3) in the eye box EB. In this case, among the samples r2 to r7 described above, it is preferable to adopt the sample r4 as the lens surface 24s.

As described above, the head-up display device 1 according to the embodiment includes a light source 22; a condensing lens 23 that condenses light from the light source 22; a lens array 24 having an incident surface 24a opposed to the condensing lens 23 and an emitting surface 24b that is an opposite surface to the incident surface 24a and diffusing the light from the condensing lens 23; the liquid-crystal display unit 10 that is opposed to the emitting surface 24b, allows light from the lens array 24 to pass therethrough, and emits the light as display light; and the reflecting member 30 reflecting the display light emitted from the liquid-crystal display unit 10 and projecting the display light on the windshield 103 disposed in front of the driver's seat of the vehicle 100. The lens array 24 has, in the emitting surface 24b, a plurality of the lens surfaces 24s projecting toward the liquid-crystal display unit 10 and having an aspherical sectional shape, and, in the lens surfaces 24s, the curvature radius of the part 24t emitting the display light to be projected on the upper part 103t of the windshield 103 is smaller than the curvature radius of the part 24u emitting the display light to be projected on the lower part 103u of the windshield 103.

In the lens surface 24s of the lens array 24 of the head-up display device 1 according to the embodiment, the curvature radius of the part 24t emitting the display light to be projected on the upper part 103t of the windshield 103 is smaller than the curvature radius of the part 24u emitting the display light to be projected on the lower part 103u of the windshield 103. In the windshield 103, this configuration enables the luminance of the display light to the upper part 103t having a relatively high reflectivity to become low, and the luminance of the display light to the lower part 103u having a relatively low reflectivity to become high. This can reduce the difference between the luminance of the image viewed when the viewpoint position is the highest position (eye point EP2) in the eye box EB, and the luminance of the image viewed when the viewpoint position is the lowest position (eye point EP3) in the eye box EB. This can prevent the luminance of the image from varying when the viewpoint position (eye point EP) of the occupant D varies in the vertical direction. Thus, even if the viewpoint position of the occupant D varies in the vertical direction, the head-up display device 1 according to the embodiment can display the image with a small luminance variation and improved display quality.

In the head-up display device 1 according to the embodiment, the lens surfaces 24s extend along the image lateral direction in a ridge shape and are arranged in the image longitudinal direction; the part 24t emitting the display light to be projected on the upper part 103t of the windshield 103 is the part located on the upper side of the lens surface 24s in the image longitudinal direction; and the part 24u emitting the display light to be projected on the lower part 103u of the windshield 103 is the part located on the lower side of the lens surface 24s in the image longitudinal direction.

The curvature radius of the lens surface 24s continuously varies from the part 24t corresponding to the upper part 103t of the windshield 103 toward the part 24u corresponding to the lower part 103u of the windshield. The curvature radius of the lens surface 24s continuously varies and thus the luminance of the light emitted from the lens surface 24s also continuously varies. This can prevent the luminance of the image from varying in a stepped manner when the viewpoint position (eye point EP) of the occupant D varies in the vertical direction.

In the head-up display device 1 according to the embodiment, the shape of the lens surface 24s is a shape to minimize the luminance variation width when the viewpoint position (eye point EP) of the occupant D varies along the vertical direction.

In the head-up display device 1 according to the embodiment, the shape of the lens surface is a shape to minimize the difference between the luminance of the image viewed when the viewpoint position is the highest position (eye point EP2) in the predetermined eye box EB, and the luminance of the image viewed when the viewpoint position is the lowest position (eye point EP3) in the eye box EB. This shape of the lens surface 24s can prevent the luminance of the image from varying when the viewpoint position (eye point EP) of the occupant D varies in the vertical direction.

Note that the embodiment described above has discussed the configuration where the curvature radius of the lens surface 24s continuously varies from the upper-side part 24t toward the lower-side part 24u. However, the curvature radius of the lens surface 24s varies in a stepped manner from the upper-side part 24t toward the lower-side part 24u.

Note that the embodiment described above has discussed the configuration where the lens surfaces 24s extend along the image lateral direction in the ridge shape and are arranged in the image longitudinal direction. However, the shape and arrangement of the lens surfaces 24s is not limited to this. For example, in the lens array 24, the lens surfaces 24s may be aspheric-shape lens surfaces 24s provided in a fry-eye shape and projecting toward the liquid-crystal display unit 10. In this case, the curvature radius of the lens surface 24s in the image lateral direction is formed to be symmetrical, centered on its vertex.

Note that a diffusion board for widening the light from the light source 22 toward the eye box EB may be provided between the lens array 24 and the liquid-crystal display unit 10.

In the lens surface of the lens array of the head-up display device according to the present embodiment, the curvature radius of the part emitting the display light to be projected on the upper part of the windshield is smaller than the curvature radius of the part emitting the display light to be projected on the lower part of the windshield. The head-up display device according to the present embodiment can exhibit its effect of preventing the luminance of the image seen by the occupant from varying when the viewpoint position of the occupant varies in the vertical direction.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A head-up display device comprising:
    a light source;
    a condensing lens that condenses light from the light source;
    a lens array having an incident surface opposed to the condensing lens and an emitting surface that is an opposite surface to the incident surface;
    a liquid-crystal display unit that is opposed to the emitting surface, and is configured to emit the light as display light by allowing light from the lens array to pass therethrough; and
    a reflecting member that reflects display light emitted from the liquid-crystal display unit and projecting the display light on a windshield disposed in front of a driver's seat of a vehicle, wherein
    the lens array has, in the emitting surface, a plurality of lens surfaces projecting toward the liquid-crystal display unit and having an aspherical sectional shape, and
    in the lens surface, a curvature radius of a part arranged so as to emit display light onto an upper part of the windshield is smaller than a curvature radius of a part arranged so as to emit display light onto a lower part of the windshield.

2. The head-up display device according to claim 1, wherein
    the lens surfaces extend along an image lateral direction in a ridge shape and are arranged in an image longitudinal direction,
    the part emitting the display light to be projected on the upper part of the windshield is a part located on an upper side of the lens surface in the image longitudinal direction, and
    the part emitting the display light to be projected on the lower part of the windshield is a part located on a lower side of the lens surface in the image longitudinal direction.

3. The head-up display device according to claim 1, wherein
    the curvature radius of the lens surface continuously varies from a part corresponding to the upper part of the windshield toward a part corresponding to the lower part of the windshield.

4. The head-up display device according to claim 2, wherein
    the curvature radius of the lens surface continuously varies from a part corresponding to the upper part of the windshield toward a part corresponding to the lower part of the windshield.

5. The head-up display device according to claim 1, wherein
    a shape of the lens surface is a shape to minimize luminance variation width when a viewpoint position of an occupant varies along a vertical direction.

6. The head-up display device according to claim 2, wherein
    a shape of the lens surface is a shape to minimize luminance variation width when a viewpoint position of an occupant varies along a vertical direction.

7. The head-up display device according to claim 3, wherein
    a shape of the lens surface is a shape to minimize luminance variation width when a viewpoint position of an occupant varies along a vertical direction.

8. The head-up display device according to claim 4, wherein
    a shape of the lens surface is a shape to minimize luminance variation width when a viewpoint position of an occupant varies along a vertical direction.

9. The head-up display device according to claim 1, wherein
    a shape of the lens surface is a shape to minimize the difference between luminance of an image viewed when a viewpoint position is a highest position in a predetermined eye box, and luminance of an image viewed when the viewpoint position is a lowest position in the eye box.

10. The head-up display device according to claim 2, wherein
    a shape of the lens surface is a shape to minimize the difference between luminance of an image viewed when a viewpoint position is a highest position in a predetermined eye box, and luminance of an image viewed when the viewpoint position is a lowest position in the eye box.

11. The head-up display device according to claim 3, wherein
    a shape of the lens surface is a shape to minimize the difference between luminance of an image viewed when a viewpoint position is a highest position in a predetermined eye box, and luminance of an image viewed when the viewpoint position is a lowest position in the eye box.

12. The head-up display device according to claim 4, wherein
    a shape of the lens surface is a shape to minimize the difference between luminance of an image viewed when a viewpoint position is a highest position in a predetermined eye box, and luminance of an image viewed when the viewpoint position is a lowest position in the eye box.

13. The head-up display device according to claim 5, wherein
    a shape of the lens surface is a shape to minimize the difference between luminance of an image viewed when a viewpoint position is a highest position in a predetermined eye box, and luminance of an image viewed when the viewpoint position is a lowest position in the eye box.

14. The head-up display device according to claim 6, wherein a shape of the lens surface is a shape to minimize the difference between luminance of an image viewed when a viewpoint position is a highest position in a predetermined eye box, and luminance of an image viewed when the viewpoint position is a lowest position in the eye box.

15. The head-up display device according to claim 7, wherein
a shape of the lens surface is a shape to minimize the difference between luminance of an image viewed when a viewpoint position is a highest position in a predetermined eye box, and luminance of an image viewed when the viewpoint position is a lowest position in the eye box.

16. The head-up display device according to claim 8, wherein
a shape of the lens surface is a shape to minimize the difference between luminance of an image viewed when a viewpoint position is a highest position in a predetermined eye box, and luminance of an image viewed when the viewpoint position is a lowest position in the eye box.

17. A head-up display device comprising:
a light source;
a condensing lens that condenses light from the light source;
a lens array having an incident surface opposed to the condensing lens and an emitting surface that is an opposite surface to the incident surface;
a liquid-crystal display unit that is opposed to the emitting surface, and is configured to emit the light as display light by allowing light from the lens array to pass therethrough; and
a reflecting member that reflects display light emitted from the liquid-crystal display unit and projecting the display light on a windshield disposed in front of a driver's seat of a vehicle, wherein
the lens array has, in the emitting surface, a plurality of lens surfaces projecting toward the liquid-crystal display unit and having an aspherical sectional shape, and
in the lens surface, a curvature radius of a part emitting display light to be projected on an upper part of the windshield is smaller than a curvature radius of a part emitting display light to be projected on a lower part of the windshield,
wherein a shape of the lens surface is a shape to minimize luminance variation width when a viewpoint position of an occupant varies along a vertical direction.

18. A head-up display device comprising:
a light source;
a condensing lens that condenses light from the light source;
a lens array having an incident surface opposed to the condensing lens and an emitting surface that is an opposite surface to the incident surface;
a liquid-crystal display unit that is opposed to the emitting surface, and is configured to emit the light as display light by allowing light from the lens array to pass therethrough; and
a reflecting member that reflects display light emitted from the liquid-crystal display unit and projecting the display light on a windshield disposed in front of a driver's seat of a vehicle, wherein
the lens array has, in the emitting surface, a plurality of lens surfaces projecting toward the liquid-crystal display unit and having an aspherical sectional shape, and
in the lens surface, a curvature radius of a part emitting display light to be projected on an upper part of the windshield is smaller than a curvature radius of a part emitting display light to be projected on a lower part of the windshield,
wherein a shape of the lens surface is a shape to minimize the difference between luminance of an image viewed when a viewpoint position is a highest position in a predetermined eye box, and luminance of an image viewed when the viewpoint position is a lowest position in the eye box.

* * * * *